(12) United States Patent
Serra

(10) Patent No.: US 6,809,703 B2
(45) Date of Patent: Oct. 26, 2004

(54) CONTACTLESS ELECTRONIC TAG FOR THREE-DIMENSIONAL OBJECT

(75) Inventor: Didier Serra, Septeme les Vallons (FR)

(73) Assignee: Inside Technologies, Saint Clement les Places (FR)

( * ) Notice: Subject to any disclaimer, the term of this patent is extended or adjusted under 35 U.S.C. 154(b) by 0 days.

(21) Appl. No.: 10/351,148

(22) Filed: Jan. 24, 2003

(65) Prior Publication Data

US 2003/0112143 A1 Jun. 19, 2003

Related U.S. Application Data

(63) Continuation of application No. PCT/FR01/02311, filed on Jul. 17, 2001.

(30) Foreign Application Priority Data

Jul. 28, 2000 (FR) .......................................... 00 10002

(51) Int. Cl.$^7$ ................................................ H01Q 1/36
(52) U.S. Cl. ........................ 343/895; 343/867; 340/572
(58) Field of Search ................................ 343/741, 742, 343/866, 867, 895; 340/572

(56) References Cited

U.S. PATENT DOCUMENTS

| 5,574,470 A | | 11/1996 | de Vall | |
|---|---|---|---|---|
| 5,604,485 A | * | 2/1997 | Lauro et al. | 340/572.5 |
| 5,608,417 A | * | 3/1997 | de Vall | 343/895 |
| 5,955,723 A | | 9/1999 | Reiner | |

FOREIGN PATENT DOCUMENTS

| DE | 197 17 505 A1 | 11/1998 |
|---|---|---|
| EP | 0 783 190 A1 | 7/1997 |
| FR | 2 697 801 A1 | 5/1994 |
| FR | 2 706 422 A1 | 12/1994 |

* cited by examiner

Primary Examiner—Shih-Chao Chen
(74) Attorney, Agent, or Firm—Akin Gump Strauss Hauer & Feld, L.L.P.

(57) ABSTRACT

An electronic tag (30, 40) is provided comprising a contactless integrated circuit (10) and a main coil antenna (Ls) comprising at least two distinct non-coplanar and/or non-coaxial windings (Ls1–Ls4) arranged in series. Applications to the reading of a tag from any face of a three-dimensional object.

15 Claims, 5 Drawing Sheets

CONTACTLESS ELECTRONIC TAG FOR THREE-DIMENSIONAL OBJECT

CROSS-REFERENCE TO RELATED APPLICATIONS

This application is a continuation of International Application No. PCT/FR01/02311, filed Ju. 17, 2001, the disclosure of which is incorporated herein by reference.

The present invention relates to contactless electronic tags, produced by means of a contactless integrated circuit and a coil antenna.

In recent years, so-called "contactless" integrated circuits have been developed and devised, that are capable of receiving or transmitting data by inductive coupling, through a coil antenna. Examples of embodiments of these integrated circuits are described in applications WO 98/02840, WO 98/02980, WO 98/05123, WO 98/06057 and WO 98/06056 in the name of the applicant. Furthermore, these integrated circuits are being standardized and are more particularly the subject of the draft standard ISO 14443, mentioned herein without restriction.

These contactless integrated circuits have the advantage of being able to be electrically powered by electromagnetic induction through their coil antenna, without it being necessary to attach a voltage source such as an electric cell to them. On the other hand, they offer quite short communication distances, in the order of a few centimetres to some tens of centimetres, and are intended for so-called proximity applications. Among these applications, the most common ones are the production of smart cards, electronic badges and electronic tags.

Figure 1:
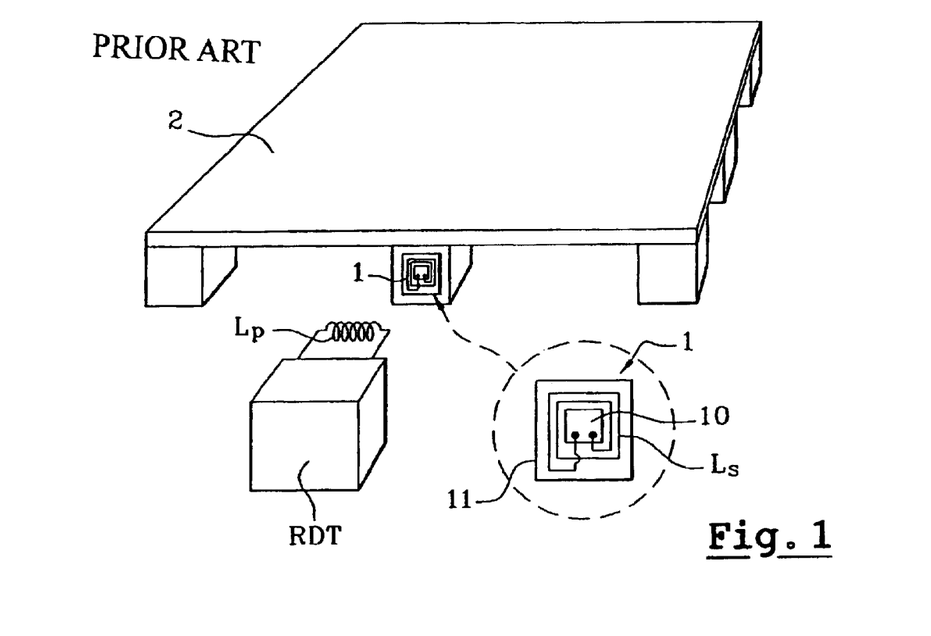
FIG. 1 represents a classical tray for the transportation of goods equipped with an electronic tag.

Contactless electronic tags can themselves be used in various applications such as the identification of products or goods, inventory management and freight forwarding management. In these applications, the electronic tags are generally placed on containers, packing boxes or trays for the transportation of goods such as pallets. As an example, FIG. 1 represents an electronic tag 1 placed on a pallet 2 for the transportation of goods. The electronic tag 1 comprises a contactless integrated circuit 10 and a coil antenna Ls connected to the integrated circuit 10, the assembly being arranged on a support 11, such as a self-adhesive plastic sheet fixed onto the pallet 2 for example. When the integrated circuit 10 is activated by a magnetic field FLD sent by the coil Lp of a tag reader RDT, data can be exchanged between the reader RDT and the integrated circuit 10, by inductive coupling. The integrated circuit 10 generally comprises a read and write access electrically erasable and programmable memory, so that the electronic tag 1 can be used to store data identifying the pallet, its age, the date it was put into service, as well as the goods it carries, in particular the type, the manufacturing date, the origin and the destination of the goods, etc.

In this application, it is desirable to be able to read the electronic tag automatically upon transportation of the pallet, such as when the latter is picked up by a pallet jack (forklift truck) for example. The electronic tag 1 is therefore arranged on one side of the pallet 2, as shown in FIG. 1, and a reader RDT is integrated into the front of the pallet jack (not represented), facing the pallet-carrier fork.

The disadvantage of this solution is that due to the short communication distance offered by the inductive coupling technique, the side of the pallet 2 that bears the electronic tag 1 must be facing the front of the pallet jack so that the coil Lp of reader RDT is located in the proximity of the coil Ls of the tag 1.

However, in practice, the pallets are likely to be picked up on several of their sides, at least by two of their sides for certain types of pallets and by any one side for other types of pallets. For example, the pallets may be picked up by one side when they are deposited in a storage site, and then be picked up by their opposite side when they are removed. A similar problem occurs for the handling of objects such as boxes or containers of goods, when an automatic reading of electronic tags placed on one face of these objects is required.

Thus, the purpose of the present invention is to provide a means enabling an electronic tag placed on one face of a three-dimensional object to be read from a different face of the object to the one on which the electronic tag is placed.

This object is achieved by providing an electronic tag comprising at least one contactless integrated circuit and at least one main coil antenna, in which the main coil antenna comprises at least two non-coplanar and/or non-coaxial windings arranged in series, the two windings, if they are coaxial, being a distance apart from each other which is at least equal to the diameter of one of the windings.

According to one embodiment, the integrated circuit is connected to the two terminals of the main coil antenna.

According to one embodiment, the main coil antenna is in closed loop and the integrated circuit is connected to an auxiliary coil which is inductively coupled to one of the windings of the main coil antenna in closed loop.

According to one embodiment, each of the windings of the main coil antenna is arranged on one face of a three-dimensional object.

The present invention also relates to a three-dimensional object comprising two non-coplanar and/or non-coaxial windings arranged in series at least on two of its faces or in the vicinity of two of its faces, forming together a coil antenna for electronic tag, the two windings, if they are coaxial, being a distance apart from each other which is at least equal to the diameter of one of the windings.

The present invention also relates to a three-dimensional object comprising two non-coaxial windings arranged in series on one of its faces, forming together a coil antenna for electronic tag.

According to one embodiment, the object comprises an integrated circuit on one of its faces, or i n the vicinity of one of its faces, said integrated circuit being connected to the two terminals of the coil antenna.

According to one embodiment, the object comprises an integrated circuit on one of its faces, or in the vicinity of one of its faces, said integrated circuit being connected to a first auxiliary coil which is inductively coupled to one of the windings of the coil antenna.

According to one embodiment, the object comprises at least a second integrated circuit connected to a second auxiliary coil which is inductively coupled to one of the windings of the coil antenna.

According to one embodiment, the coil antenna is incorporated into the body of the object.

According to one embodiment, the object forms a pallet for the transportation of goods.

According to one embodiment, the object forms a cardboard box for the transportation of goods.

These and other features of the present invention will be explained in greater detail in the following description of examples of an embodiment-of an electronic tag according to the present invention and an example of an embodiment of a three-dimensional object comprising such a tag, given in relation with, but not limited to, the following figures:

DETAILED DESCRIPTION OF THE INVENTION

Figure 2:
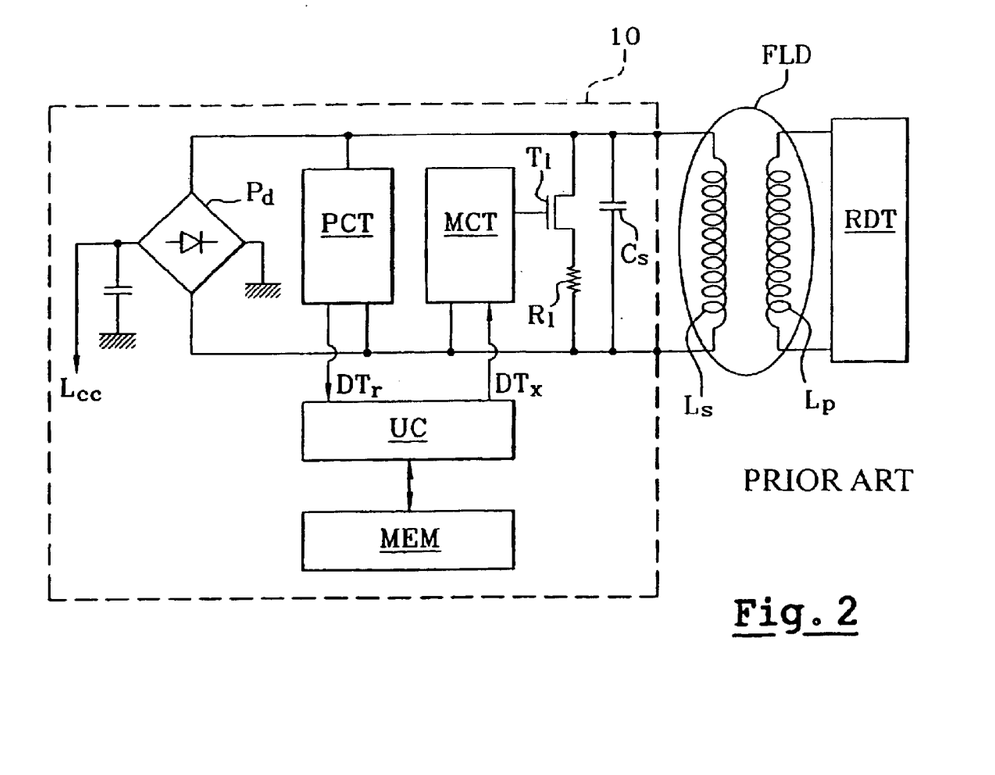
FIG. 2 represents in block form the classical architecture of a contactless integrated circuit.

As a reminder, FIG. 2 represents a classical example of architecture of contactless integrated circuit 10 for electronic tag. The integrated circuit 10 comprises an internal capacitor Cs forming a resonant antenna circuit of LC type with the coil antenna Ls, a bridge rectifier Pd with diodes, a demodulation circuit DCT connected to the terminals of the antenna circuit LsCs, a load modulation circuit MCT, a central processing unit UC and a memory MEM comprising an electrically erasable and programmable area. The load modulation circuit MCT drives a load modulation transistor T1 that is connected to the terminals of the coil Ls through a load resistor R1.

When the coil Ls is located in the magnetic field FLD sent by the coil Lp of a tag reader RDT, such as a magnetic field oscillating at 13.56 MHz for example (ISO 14443 standard), an induced alternating voltage Va occurs at the terminals of the coil Ls. The voltage Va is rectified by the diode bridge Pd the output of which delivers a supply voltage Vcc of the integrated circuit. The data transmission from the reader RDT to the integrated circuit 10 is carried out by modulating the amplitude of the magnetic field FLD sent by the reader. The induced voltage Va is demodulated by the circuit DCT that delivers the data received DTr to the central processing unit UC. Conversely, the data transmission from the integrated circuit 10 to the reader RDT is carried out by modulating the load of the coil antenna Ls, which is passed onto the coil antenna Lp of the reader RDT. This load modulation is carried out by the modulator circuit MCT, which applies, to the transistor T1, a load modulating signal established according to data DTx provided by the central processing unit UC.

In order to solve the problem set forth in the preamble and to enable the multidimensional reading of an electronic tag arranged on one face of a three-dimensional object, the idea of the present invention is to "explode" the coil antenna Ls of the tag into several distinct windings, arranged in series, the number of which depends on the application sought, and to arrange these windings:

either on several faces of the three-dimensional object,
or at different locations on the same face of the three-dimensional object, in particular when the object is large in size.

It will be understood that a combination of these two possibilities is conceivable.

Generally speaking, two windings according to the present invention differ from two windings of a classical coil by the fact that they are non-coplanar and/or non-coaxial windings. In fact, if they are arranged on the same face of an object, they are coplanar but not coaxial. If they are arranged on two parallel faces of an object, they are not coplanar but may be coaxial. Finally, if they are arranged on two planes that are not parallel, they are neither coplanar nor coaxial.

Figure 3:
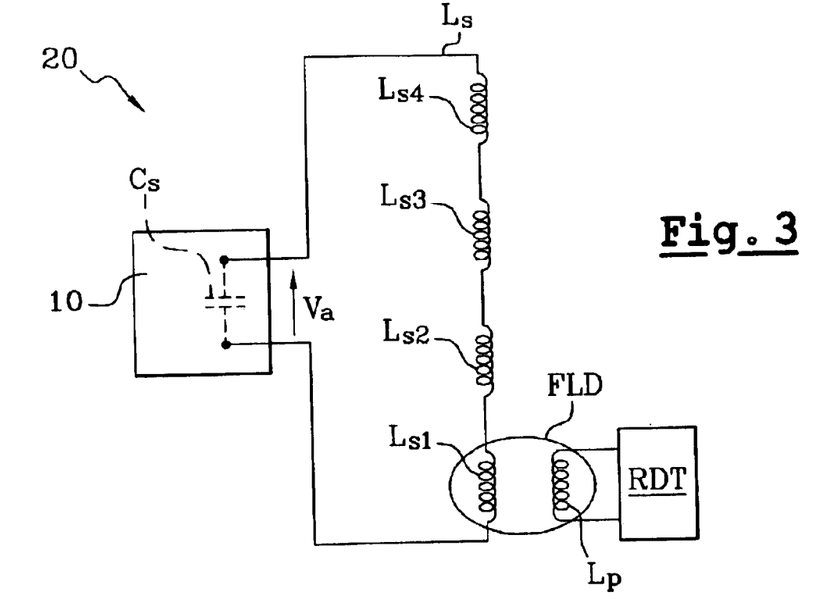
FIG. 3 is the wiring diagram of a first embodiment of an electronic tag according to the present invention.

FIG. 3 is the wiring diagram of an electronic tag 20 according to the present invention in which the coil Ls of the contactless integrated circuit 10 is "exploded" into four windings Ls1, Ls2, Ls3, Ls4. The windings Ls1, Ls2, Ls3, Ls4 form an equivalent coil antenna Ls which itself forms, with the capacitor Cs present in the integrated circuit 10, a resonant antenna circuit.

When an electronic tag reader RDT is brought close to a winding, such as the winding Ls1 in FIG. 3 for example, at least the winding Ls1 is excited by the magnetic field FLD sent by the coil Lp of the reader. The other windings are located substantially outside the field FLD, or receive a weakened field, as will be explained later. An induced voltage Va oscillating at the resonance frequency of the antenna circuit LsCs occurs at the terminals of the resulting coil Ls, the operation of the integrated circuit 10 being unchanged compared to the classical circuit in FIG. 2. The electronic tag can therefore be read from any one of the windings Ls1, Ls2, Ls3, Ls4, which are placed on different faces or on the same face of the three-dimensional object, as indicated above.

Figure 4:
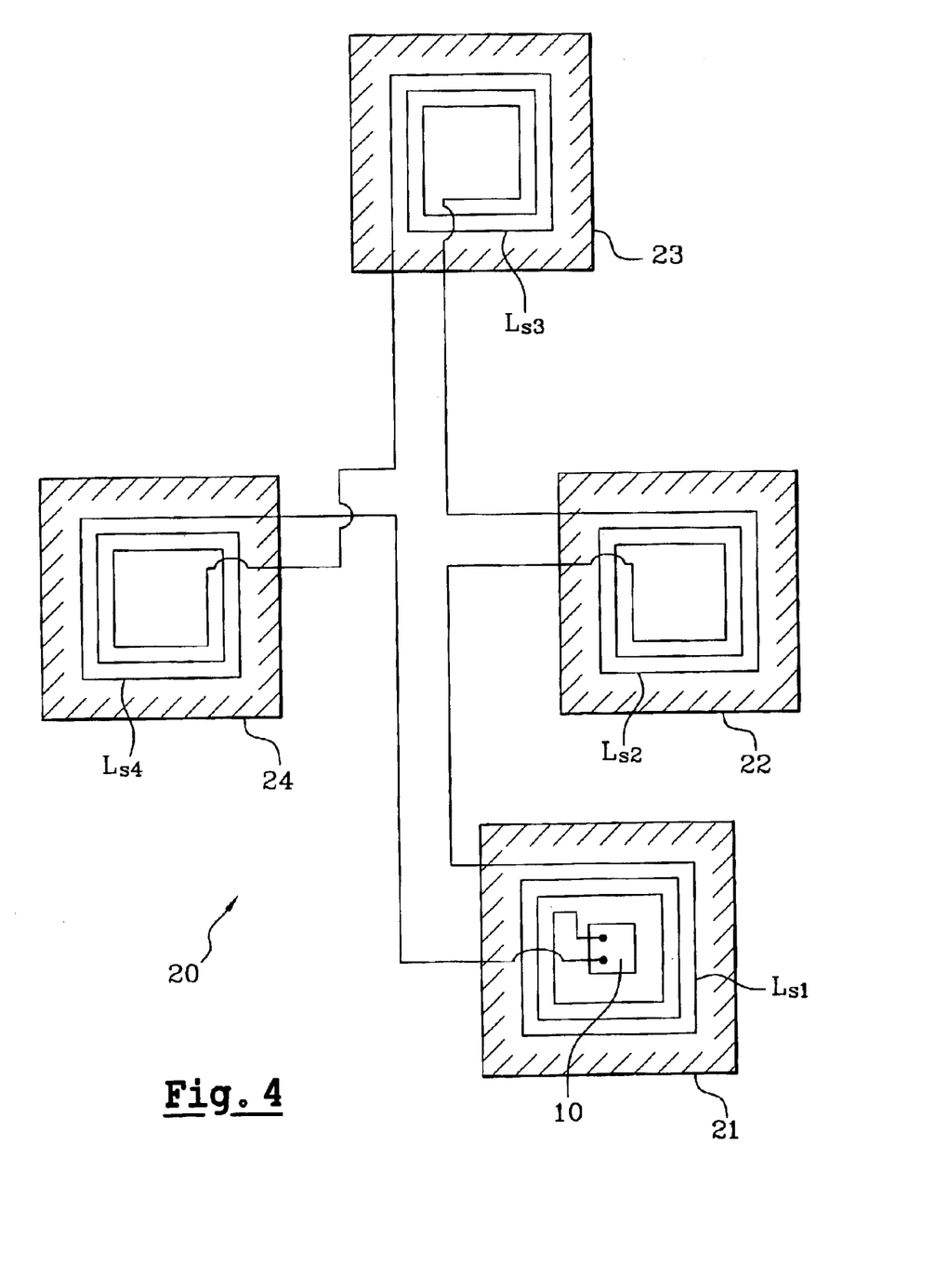
FIG. 4 represents an example of an embodiment of the electronic tag in FIG. 3.

FIG. 4 illustrates an example of an embodiment of an electronic tag 20 in accordance with the wiring diagram in FIG. 3. The tag comprises a first support 21 on which the integrated circuit 10 and the first winding Ls1 are arranged. The integrated circuit 10 has a first antenna connection terminal that is connected to one terminal of the winding Ls1. The other terminal of the winding Ls1 is not connected to the second connection terminal of the integrated circuit 10 but extends beyond the support 21 to form, on a support 22, the second winding Ls2. The other terminal of the second winding Ls2 itself extends beyond the support 22 to form, on a support 23, the third winding Ls3, which also extends beyond the support 23 to form, on a support 24, the fourth winding Ls4. The other terminal of the fourth winding Ls4 extends to come back to the support 21 where it is connected to the second antenna connection terminal of the integrated circuit 10. The windings Ls1 to Ls4 comprise a determined number of turns, at least equal to 1, calculated according to good practices depending on the linear resistivity of the conductor wire forming the windings, on the value of the capacitor Cs present in the integrated circuit 10, and on the desired resonance frequency. The supports 21 to 24 may be self-adhesive plastic sheets but may also be the faces of the three-dimensional object onto which the coil Ls is integrated. The windings Ls1 to Ls4 may be formed by a continuous, uninterrupted conductor wire, as represented, or by wire sections comprising, at the two terminals of each winding Ls1 to Ls4, a pin to connect to the other windings.

Figure 5:
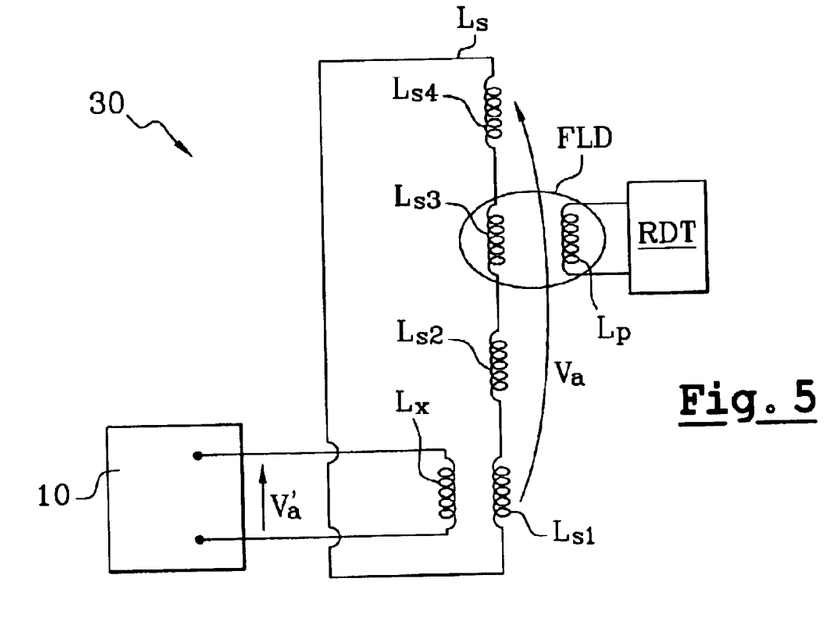
FIG. 5 is the wiring diagram of a second embodiment of an electronic tag according to the present invention.

FIG. 5 is the wiring diagram of another embodiment 30 of the, tag in FIG. 3. In this embodiment, the structure of the coil Ls comprises, as above, four distinct windings Ls1 to Ls4 but the two ends of the coil Ls are connected together instead of being connected to the antenna connection terminals of the integrated circuit 10. Here, the coil Ls is therefore arranged in closed loop. The integrated circuit 10 is connected to an auxiliary coil Lx which is coupled to one of the windings of the coil Ls, such as the winding Ls1 for example, at least one turn of the auxiliary coil Lx being arranged in the proximity of at least one turn of the winding Ls1. Thus, when the coil Lp of the reader RDT is brought close to a winding of the coil Ls, such as the winding Ls3 in FIG. 5 for example, an induced voltage Va occurs at the terminals of the coil Ls and an induced voltage Va' occurs at the terminals of the auxiliary coil Lx due to its inductive coupling with the winding Ls1. The operation of the integrated circuit is therefore identical to that of the integrated circuit 10 arranged in the classical tag in FIG. 2.

In practice, the auxiliary coil Lx can be integrated onto the silicon wafer of the integrated circuit 10, according to the so-called "coil on chip" technique. The coil Lx can also be integrated with the circuit 10 into a polyimide/silicon micromodule of the type described in the international application WO 00/01013 in the name of the applicant. Finally, the coil Lx can also be arranged on the support of the integrated circuit 10, as will be explained below with reference to FIG. 6.

Figure 6:
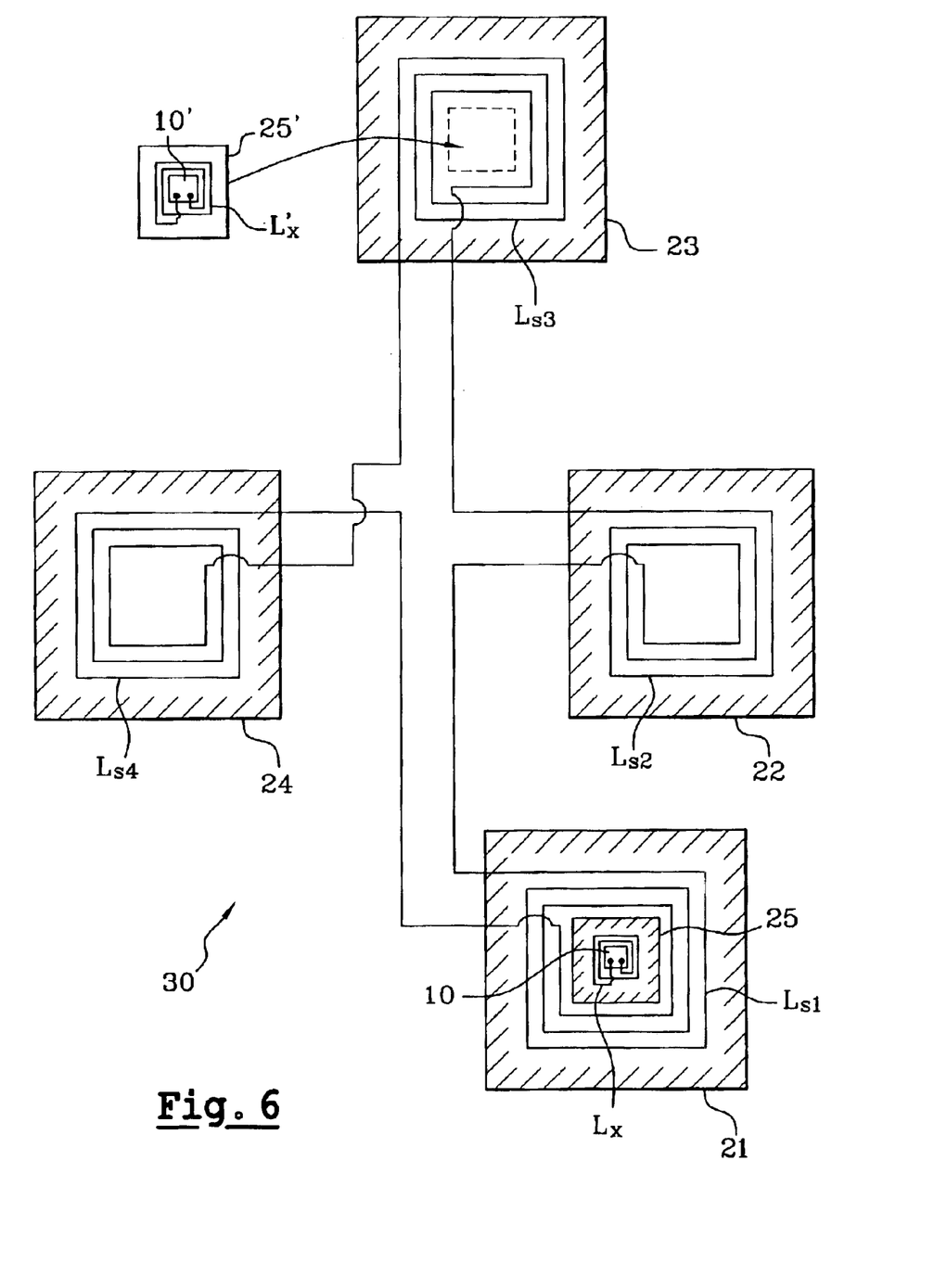
FIG. 6 represents an example of an embodiment of the electronic tag in FIG. 5.

FIG. 6 illustrates an example of an embodiment of an electronic tag 30 in accordance with the wiring diagram in FIG. 5. The coil Ls formed by the windings Ls1, Ls2, Ls3, Ls4 respectively arranged on the supports 21, 22, 23, 24 already described above is present again, the coil Ls differing from the embodiment in FIG. 4 by the fact that it is connected in closed circuit. In the centre of the winding Ls1 a support 25 is arranged on which the integrated circuit 10 and the auxiliary coil Lx are located, the latter being connected to the terminals of the integrated circuit 10 and surrounding the same.

As described above, the supports 21 to 24 may be distinct supports from the three-dimensional object on which the tag 30 is arranged, or may represent the faces of the three-dimensional object. The support 25 which bears the integrated circuit 10 and the auxiliary coil Lx may be a distinct support from the support 21, such as a self-adhesive plastic sheet stuck in the centre of the winding Ls1 for example. Furthermore, the coil Lx may be integrated onto the silicon wafer of the integrated circuit 10 ("coil on chip") or be incorporated with the integrated circuit 10 onto a silicon/polyimide micromodule, as described above.

In practice, the implementation of the present invention requires compliance with certain rules of design and arrangement of the windings, so that the magnetic fields in the windings do not neutralize each other. These design rules are within the understanding of those skilled in the art and must take into account various parameters such as the rate of inductive coupling between the windings and the attenuation of the magnetic field from one winding to another. The rate of inductive coupling depends on the size of the windings, on the distance between them and on their respective orientations. For example, two windings that are not very far apart from one another do not necessarily have a higher inductive coupling than two distant windings, if the windings that are close together are small in size whereas the distant windings are large in size. Also, the rate of inductive coupling is low if windings, although close together, are arranged according to different orientations, such as on two orthogonal faces of an object for example.

Generally speaking, the rate of inductive coupling between the windings of a tag according to the present invention must be low if the windings have opposite winding directions. On the other hand, a high coupling can be tolerated if the windings have identical winding directions. It is therefore necessary to ensure that windings that have opposite winding directions are not highly coupled or to provide the same winding direction if a high coupling cannot be avoided.

In any case, as the present invention is mainly intended for three-dimensional objects the dimensions of which are quite significant with regard to the diameter of the windings, the windings of a tag according to the present invention will generally not be coupled at all or very little.

One of the two following empiric and experimental design rules may thus be retained:

rule a): two windings are a distance apart from one another that is at least equal to the diameter of one of the windings if they are coaxial, or rule b): the two windings are a distance apart from one another that is at least equal to the diameter of one of the windings, regardless of their arrangement.

In practice, the rule b) can be considered as optional as there is not, a priori, any technical need to move two coplanar windings away from each other. The distance between two coplanar windings referred to in rule b) will nevertheless be effective in a significant majority of applications since the main object of the present invention is to facilitate the reading of an electronic tag associated to a large object.

Furthermore, even if two windings are coupled and have opposite winding directions (such as two windings arranged on two parallel faces of an object for example), a tag according to the present invention operates properly if the magnetic field is not uniform from one winding to the other. Now, the magnetic field is generally not uniform with a classical reading device, as such a device sends a magnetic field the range of which is low, in the order of a few centimetres to some tens of centimetres. Thus, a magnetic field generated in the vicinity of a winding placed on a first face of an object will be considerably attenuated in the vicinity of a winding placed on a second face of the object, such that the first winding will override the second one even if they are coupled and have opposite winding directions.

Figure 7:
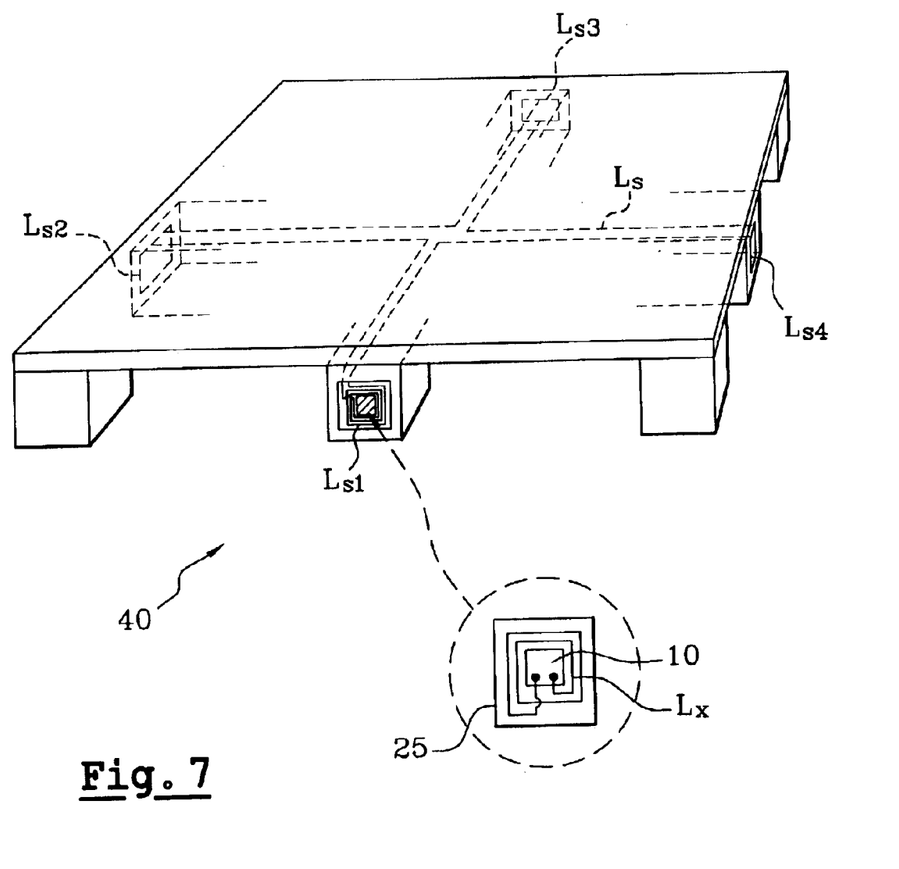
FIG. 7 represents a tray for the transportation of goods according to the present invention.

As an example of application, FIG. 7 is a schematic representation of a pallet 40 according to the present invention, intended for the transportation of goods. According to one preferred embodiment of this pallet, the pallet 40 is produced by injecting plastic material and incorporating, when it is manufactured, a main antenna Ls according to the present invention, comprising four windings Ls1, Ls2, Ls3, Ls4 respectively arranged on each of the sides of the pallet, here on the outer faces of the central beams of the pallet frame. The pallet thus produced is ready to receive an integrated circuit 10 and its auxiliary coil Lx arranged on a support 25. The contactless integrated circuit may be placed on any face comprising one of the windings Ls1 to Ls4, in the centre of the selected winding, such as the winding Ls1 in FIG. 7 for example. The integrated circuit 10 arranged with its auxiliary coil Lx on the support 25 forms an electronic tag in its own right that is capable of conversing with a reader. The coil Ls and its four windings Ls1 to Ls4 form a sort of relay amplifier with several inputs/outputs, making communication with the tag possible from any one of the windings Ls1 to Ls4.

It will be understood that the integrated circuit 10 can also be arranged in the pallet 40 instead of being placed on the latter. Generally speaking, the present invention is susceptible of different variations and applications, in particular as far as the production of windings Ls1 to Ls4 and the auxiliary coil Lx, and their integration into a three-dimensional object are concerned. The windings Ls1 to Ls4 according to the present invention may be arranged on the four faces of a packing box for example. They can be produced by means of a copper strip stuck onto the surface of the three-dimensional object or be integrated into the material of the object itself. They can also be produced by means of electrically conductive ink.

Furthermore, although the number of independent windings forming the main coil Ls is equal to four in the description above, it is obvious that this number of windings may be higher or lower than four depending on the application sought.

Finally, as shown in FIG. 6, an electronic tag according to the present invention may also comprise a second contactless integrated circuit 10' connected to a second auxiliary coil Lx'. The second integrated circuit 10' and its auxiliary coil Lx' can be arranged in the centre of the winding that receives the first integrated circuit 10 and its auxiliary coil Lx or, if there is not sufficient space available, in the centre of another winding, such as the winding Ls3 in FIG. 6 for example. In this embodiment, the first contactless integrated circuit 10 may be dedicated to logging data relating to the management of the goods support (date on which it was put into service, manufacturer, owner, maximum laden weight, use-by date, recycling place, places of storage with no load) whereas the second contactless integrated circuit 10' may be dedicated to logging data concerning the goods contained or carried by the support (type of goods, origin, owner, consignee, manufacturing date, serial numbers . . . ). As the integrated circuits 10, 10' are intended to be simultaneously activated by a contactless reader, they include a communications control program implementing an anti-collision protocol, such as the one described in the ISO 14443 standard or the one described in application WO 97/42578 for example. Thus, the tag reader, which is also equipped with the anti-collision protocol, can read and/or write select one of the two integrated circuits depending on the data to be read and/or written. It will be understood that other contactless integrated circuits may be arranged in one of the windings of a coil antenna according to the present invention.

I claim:

1. An electronic tag having at least one contactless integrated circuit, an auxiliary coil and at least one main coil antenna, the main coil antenna comprising:

at least two non-coplanar or non-coaxial windings arranged in series, the main coil antenna being closed-looped, the integrated circuit being connected to the auxiliary coil and the auxiliary coil being inductively coupled to one of the windings of the closed-looped main coil antenna.

wherein each of the windings of the main coil antenna is arranged on one face of a three-dimensional object.

2. A three-dimensional object comprising:

two non-coplanar or non-coaxial windings arranged in series and being disposed on at least two faces of the three-dimensional object or in the vicinity of two faces of the three-dimensional object, the two windings together forming a coil antenna for an electronic tag, when the two windings are coaxial, the two windings are spaced a distance apart from each other which is at least equal to the diameter of one of the two windings, and an integrated circuit on one of the faces of the three-dimensional object or in the vicinity of one of the faces of the three-dimensional object, the integrated circuit being connected to a first auxiliary coil which is inductively coupled to one of the windings of the coil antenna.

3. The object according to claim 2, further comprising at least a second integrated circuit connected to a second auxiliary coil which is inductively coupled to one of the windings of the coil antenna.

4. The object according to claim 2, wherein the coil antenna is incorporated into a body of the object.

5. The object according to claim 2, forming a pallet for the transportation of goods.

6. The object according to claim 2, forming a cardboard box for the transportation of goods.

7. A three-dimensional object for the transportation of goods, such as a pallet or a cardboard box, the three-dimensional object comprising:

at least two non-coplanar or non-coaxial windings arranged in series at least on two faces of the three-dimensional object or in the vicinity of two faces of the three-dimensional object, the main coil antenna having two terminals, a contactless integrated circuit arranged on one of the faces of the three-dimensional object, the contactless integrated circuit forming the electronic part of the contactless tag and being connected or inductively coupled to the main coil antenna.

8. The object according to claim 7, wherein the contactless integrated circuit is connected to an auxiliary coil which is inductively coupled to one of the windings of the main coil antenna, the main coil antenna being connected in closed loop.

9. The object according to claim 7, wherein the contactless integrated circuit is connected to the terminals of the main antenna coil.

10. The object according to claim 7, wherein the windings of the main coil antenna are incorporated into the body of the object in the vicinity of the faces of the object.

11. The object according to claim 7, wherein each of the windings of the main coil antenna is arranged on an individual support such as a self-adhesive plastic sheet, the support being mounted on the corresponding face of the object.

12. The object according to claim 11, wherein the contactless integrated circuit is arranged on the support of one of the windings of the main coil.

13. A contactless electronic tag having a main coil antenna, the main coil antenna comprising:

a first winding arranged on a first individual support such as a self-adhesive plastic sheet, intended to be mounted on a three-dimensional object, at least a second winding arranged on a second individual support such as a second self-adhesive plastic sheet, intended to be mounted on the three-dimensional object, the second winding being non-coplanar or non-coaxial to the first winding and being linked in series with the first winding to form the main coil antenna of the contactless electronic tag, the main coil antenna having two terminals, the second support being different from the first support and not mechanically linked to the first support except for the electrical link between the windings, the first and second windings with respective first and second supports are configured to be mounted on different faces of the three-dimensional object, and a contactless integrated circuit arranged on an individual support that can be one of the first or second supports or a third support, forming the electronic part of the contactless tag, the contactless integrated circuit being connected or inductively coupled to the main coil antenna.

14. The contactless electronic tag according to claim 13, wherein the contactless integrated circuit is connected to an auxiliary coil which is inductively coupled to one of the windings of the mains coil antenna, the main coil antenna being connected in closed loop.

15. The contactless electronic tag according tag according to claim 13, wherein the contactless integrated circuit is connected to the terminals of the main antenna coil.

* * * * *

UNITED STATES PATENT AND TRADEMARK OFFICE
CERTIFICATE OF CORRECTION

PATENT NO. : 6,809,703 B2
DATED : October 26, 2004
INVENTOR(S) : Didier Serra

It is certified that error appears in the above-identified patent and that said Letters Patent is hereby corrected as shown below:

Column 1,
Immediately following line 8, insert the section heading: -- BACKGROUND OF THE INVENTION --;

Column 2,
Immediately following line 10, insert the section heading: -- BRIEF SUMMARY OF THE INVENTION --;
Immediately following line 61, insert the section heading: -- BRIEF DESCRIPTION OF THE SEVERAL VIEWS OF THE DRAWINGS --;
Line 62, replace the paragraph beginning with the following:
-- The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangments and instrumentalities shown.
   In the drawings: --;

Column 7,
Immediately following line 25, insert the following paragraph:
-- It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims. --

Signed and Sealed this

First Day of February, 2005

JON W. DUDAS
*Director of the United States Patent and Trademark Office*